United States Patent
Watson

(10) Patent No.: US 7,044,459 B2
(45) Date of Patent: May 16, 2006

(54) SIMPLIFIED FLEXURAL PIVOT

(76) Inventor: Scott Edward Watson, 4841 Winton Way, San Jose, CA (US) 95124

( * ) Notice: Subject to any disclaimer, the term of this patent is extended or adjusted under 35 U.S.C. 154(b) by 52 days.

(21) Appl. No.: 10/719,744

(22) Filed: Nov. 21, 2003

(65) Prior Publication Data
US 2004/0104524 A1    Jun. 3, 2004

Related U.S. Application Data

(60) Provisional application No. 60/428,373, filed on Nov. 22, 2002.

(51) Int. Cl.
*B60G 11/22* (2006.01)
(52) U.S. Cl. ...................... 267/257; 267/37.3
(58) Field of Classification Search ............... 267/257, 267/36.1, 37.3, 42, 43, 44, 45, 257 X, 36.1 X
See application file for complete search history.

(56) References Cited

U.S. PATENT DOCUMENTS

| | | | | | |
|---|---|---|---|---|---|
| 2,793,028 | A | * | 5/1957 | Wheeler | 267/160 |
| 2,920,498 | A | * | 1/1960 | Klaus | 74/470 |
| 4,637,596 | A | * | 1/1987 | Lewis | 267/160 |
| 4,802,720 | A | * | 2/1989 | Paulsen | 359/214 |
| 4,802,784 | A | * | 2/1989 | Brooks | 403/24 |
| 6,220,550 | B1 | * | 4/2001 | McKillip, Jr. | 244/215 |
| 6,345,792 | B1 | * | 2/2002 | Bilanin et al. | 244/215 |
| 2002/0024771 | A1 | * | 2/2002 | He et al. | 360/265.7 |
| 2004/0020968 | A1 | * | 2/2004 | Howell et al. | 228/103 |

* cited by examiner

*Primary Examiner*—Devon C. Kramer

(57) ABSTRACT

An improved flexural pivot design simplifies the structure, fabrication, assembly, and integration into a device. A set of flexures 200 is affixed to two surfaces of a stationary member 100 and a single surface of a rotational member 300. The set of flexures follow opposing centers of curvature 411 and 412 to provide a stable center of rotation 400 and allow repeatable limited-angle rotational motion.

12 Claims, 5 Drawing Sheets

SIMPLIFIED FLEXURAL PIVOT

CROSS-REFERENCE TO RELATED APPLICATIONS

This application claims the benefit of Provisional Patent Application Ser. No. 60/428373 filed Nov. 22, 2002.

FEDERALLY SPONSORED RESEARCH

Not Applicable

SEQUENCE LISTING

Not Applicable

BACKGROUND

1. Field of Invention

This invention advances previous flexural pivot designs by simplifying the manufacture, assembly, and integration into a device.

2. Description of Prior Art

A typical pivot consists of a combination of bearings which provide both radial and axial stiffness, while allowing a low resistance to rotation about an axis. Radial and thrust journal bearings can accomplish this with simple components, but the continual or intermittent sliding contact generates significant resistance to rotation, and material wear limits the service life. Radial and thrust roller bearings can provide the axial and radial stiffness under heavy loads, but require precision roller elements, raceway structures, and lubrication methods. A pre-loaded set of two ball bearings can provide axial and radial stiffness for light loads, but again require precision balls, raceway structures, and lubrication.

Journal, ball, and roller bearings allow a simple co-axial configuration of the fixed and rotational portions. A shaft is attached to the inner diameter of the bearings and the outer diameter of the bearings are attached to a sleeve or housing. The shaft can rotate or the sleeve can rotate. With a rotating sleeve, the shaft can be fixed at one end (cantilevered) or both ends (doubly-supported). Fixing the shaft at both ends (doubly-supported) offers a significantly more rigid structure over a cantilevered attachment, and is required in many applications. The co-axial placement of the shaft and sleeve allow a straight-forward centering of the rotational mass between the axial spacing of the bearings. The centering of the rotational mass between the radial bearing elements is usually desired to uniformly distribute radial loads.

However, journal, ball, and roller bearings have several disadvantages. They require oil or grease lubrication and the associated oil replenishment or grease seals for ensuring a long service life in harsh environments. Lubricants can migrate, decompose, or give off gasses over their working life, and degrade the performance of the bearing. Migration or off-gassing of lubricants may also contaminate surrounding parts of the device in which the bearing is mounted. These contaminants can cause failure of sensitive components such as those found on satellites or inside magnetic data storage drives. In satellites, the vacuum of space will draw-out chemical compounds from the lubricants, which can foul sensors. In magnetic data storage drives, off-gassed chemical compounds can foul critical air bearing surfaces which are designed to operate at air gaps of less than a millionth of an inch. Journal, ball, and roller bearings are also sensitive to contamination; if particles are introduced between the moving surfaces, an increased force is required to roll over the particle. Hard particles will damage the bearing surfaces and hasten bearing wear. Given the sliding wear or rolling resistance, these bearings exhibit a hysteresis-effect; frictional forces oppose motion in both rotational directions. Additionally, the properties of lubricants vary with temperature; at low temperatures an increased force is required to displace lubricants. Further, lubricants are typically non-conductive, which electrically isolates the rotational portion from the fixed portion, allowing a generally un-desirable voltage potential to develop between the two portions.

Advantages of Flexural Pivots:

For applications requiring rotational motion within a limited angular range, +/−30 degrees for example, Lucas produces and markets a line of flexural pivots as described in U.S. Pat. No. 3,811,665. FIG. 1 depicts a Lucas flexural pivot 10. A pair of flexures 13 are attached to the inner diameter of a stationary member 11. The flexures are also attached to the inner diameter of a rotational member 12.

Flexural pivots such as the Lucas pivot provide many advantages over journal bearings, ball, or roller bearings. They require neither lubrication nor the associated seals and oil replenishment systems. Without the temperature-sensitive greases or oils, their performance varies little over a wide range of temperatures. They are not sensitive to contaminants. If fabricated out of metal components, the Lucas flexural pivot can provide a continuous, low-resistance electrical path to eliminate voltage potentials between the moving and stationary portions of the pivot. With no rolling or sliding interactions, the life of a flexural pivot can be many times that of a journal, ball, or roller bearing pivot. With no friction forces to oppose rotational motion regardless of rotational direction, there is no hysteresis-effect exhibited by a flexural pivot.

Further, the flexural members of a flexural pivot provide a restoring force to the pivot, such that it will return to a repeatable angular position when external forces are removed. This is beneficial during assembly to control the relative positioning of the stationary and rotate-able portions. It is also beneficial to the application, when it is desired for the rotate-able portion to return to a pre-determined rotational location.

While the Lucas flexural pivot solved many problems, the design limited its applications. The rotating and fixed housings are both tubular forms, which allow for limited attachment methods. Attachment is necessarily made on the outer diameter of both the fixed and rotating housings, which are the same size and closely spaced along the axis of the pivot. Hence, the mating parts must be closely placed along the axis of the pivot, but not at the same axial location. The simplest of the Lucas pivots offers two separate tubular forms, one fixed and one rotational. The fixed portion is held at one end and the rotational portion is at the other end of the pivot axis. The fixed portion cannot be held at both ends of the pivot's axis. Hence, the rotational portion must be cantilevered. This cantilevered attachment offers significantly lower stiffness than a doubly-attached shaft, as journal, ball, and roller bearing pivots allow.

Further, the rotating and fixed housings of the Lucas pivot are complex forms, generally requiring wire electron-discharge machining, are well as conventional lathe and milling machine operations. Assembly of the flexures into the inner diameters of these tubular housings is difficult, especially for small pivots and small tubular diameters.

Objects and Advantages:

The current invention simplifies the fabrication of flexural pivot components, uncomplicates the assembly, improves upon methods of attachment, and allows scaling to smaller sizes. These features allow integration of this flexural pivot into a wider range of applications. These applications can now take advantage of the benefits of flexural pivots in applications where journal, ball, or roller bearing pivots have been the only choice.

SUMMARY OF INVENTION

The present invention offers a simplified flexural pivot construction and allows improved attachment methods for the fixed and rotational portions. A set of flexural members are preloaded in opposite directions to provide a stable rotational axis. These flexural members can be formed as a unitary set, as compared to the two independent flexures of the Lucas pivot. Affixing features on the stationary and rotate-able portions are simplified to external surfaces, as compared to complex internal features of the tubular forms in the Lucas pivot. Assembly is thereby simplified to external operations, as compared to the intermeshing components assembled into the tubular forms for the Lucas pivot. Fabrication of the stationary and rotate-able members can be simple metal stampings, as compared to the milled and electron-discharge machining required of the Lucas pivot components.

Integration into an application is greatly simplified. Since the stationary and rotational portions are placed on either side of the rotational axis, the rotational load can be centered between the flexure elements, along the axis of rotation. The stationary portion can be affixed at both ends (doubly-supported), providing maximum mechanical stiffness. Further, with simple attachment features, the rotate-able and stationary portions can easily be integrated into other components of the application. The stationary member can easily be integrated into the application chassis. The rotate-able portion can easily be integrated into the rotational component of the application.

All of these simplifications are accomplished, while maintaining the advantages of a flexural pivot: the absence of a hysteresis-effect, lubrication requirement, tolerance to contaminants, stable performance over temperature, continuous low-electrical resistance, long life, and a restorative force to maintain a zero-load angular position.

REFERENCE NUMERALS

Figure 1:
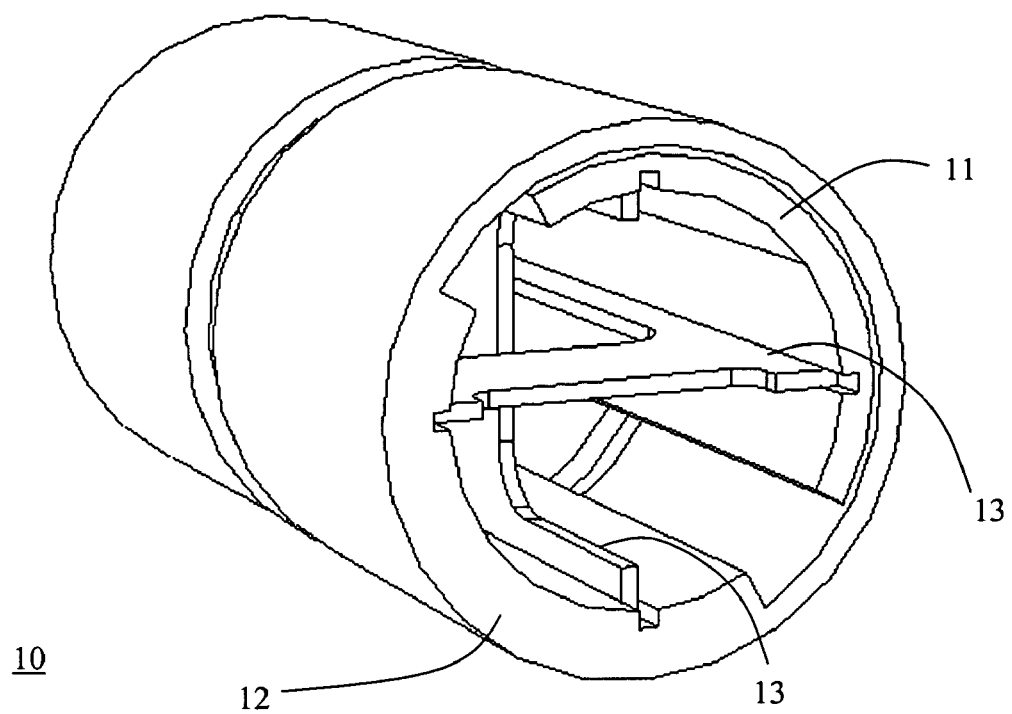
FIG. 1 is an isometric view of the prior art Lucas flexural pivot.

10 Lucas pivot (prior art)
11 Stationary member (prior art)
12 Rotational member (prior art)
13 Flexures (prior art)
100 Stationary post
101 Backside stationary post surface
102 Frontside stationary post surface
103 Spot welds
104 Mounting holes
200 Flexure system
201 Upper backside flexure
202 Upper frontside flexure
203 Lower frontside flexure
204 Lower backside flexure
300 Movable post
301 Movable post surface
303 Spot welds
304 Mounting holes
400 Axis of rotation
401 Angular direction (clock-wise)
402 Angular direction (counter clock-wise)
403 Axial direction
405 Lateral direction
406 Roll direction
407 Pitch direction
411 Approximate backside center of curvature
412 Approximate frontside center of curvature
500 Movable post
504 Axial mounting holes

DETAILED DESCRIPTION

Figure 2:
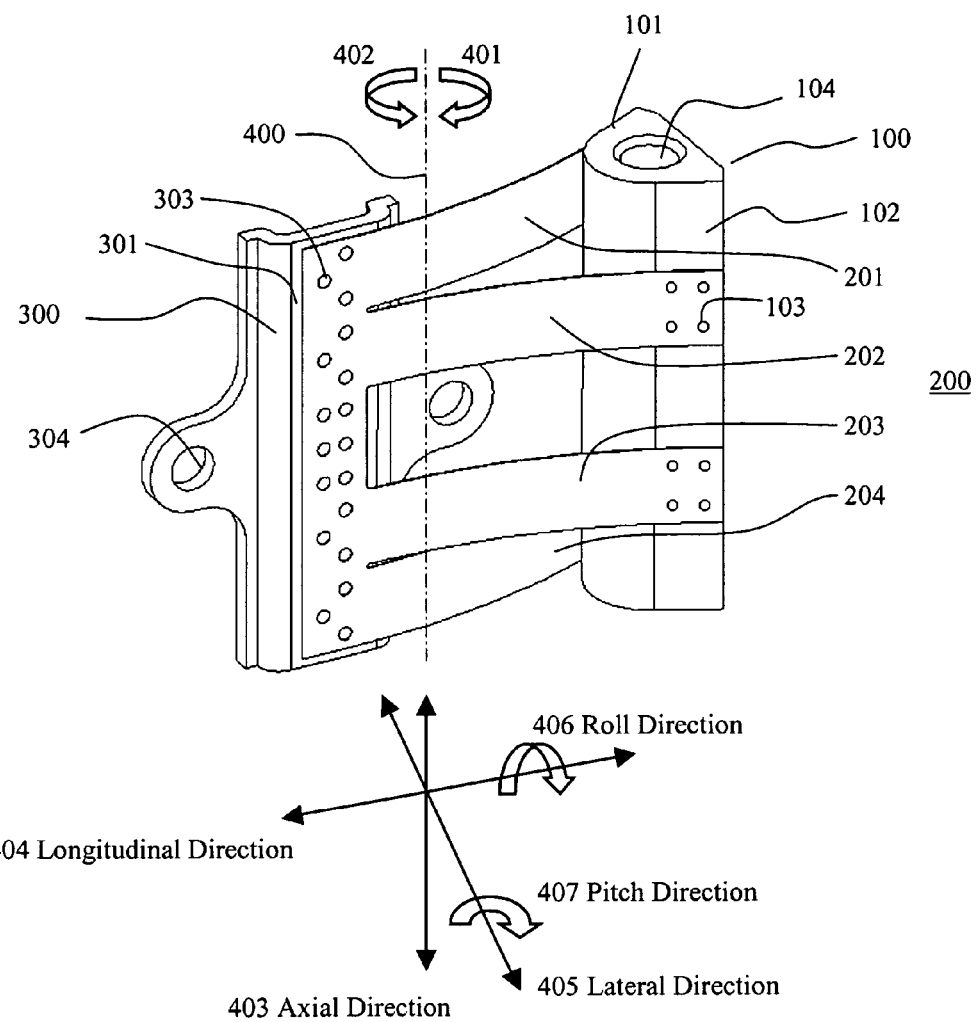
FIG. 2 is an isometric view of the current invention with a mounting flange parallel to the axis of rotation.

Description—Preferred Embodiment:

The preferred embodiment of the current invention is depicted in FIG. 2. A flexure system 200 is comprised of an upper backside flexure 201, a upper frontside flexure 202, a lower frontside flexure 203, and a lower backside flexure 204. The flexure system 200 is affixed between a stationary post 100 and a movable post 300. The stationary post 100 has two surfaces onto which the flexure system 200 is affixed: a backside stationary post surface 101 and a frontside stationary post surface 102. The upper backside flexure 201 and the lower backside flexure 204 are affixed tangent to the backside post surface 101. The upper frontside flexure 202 and the lower frontside flexure 203 are affixed tangent to the frontside stationary post surface 102. The movable post 300 has a movable post surface 301 for affixing the flexure system 200. The flexure system 200 is affixed tangent to the movable post surface 301.

Figure 3:
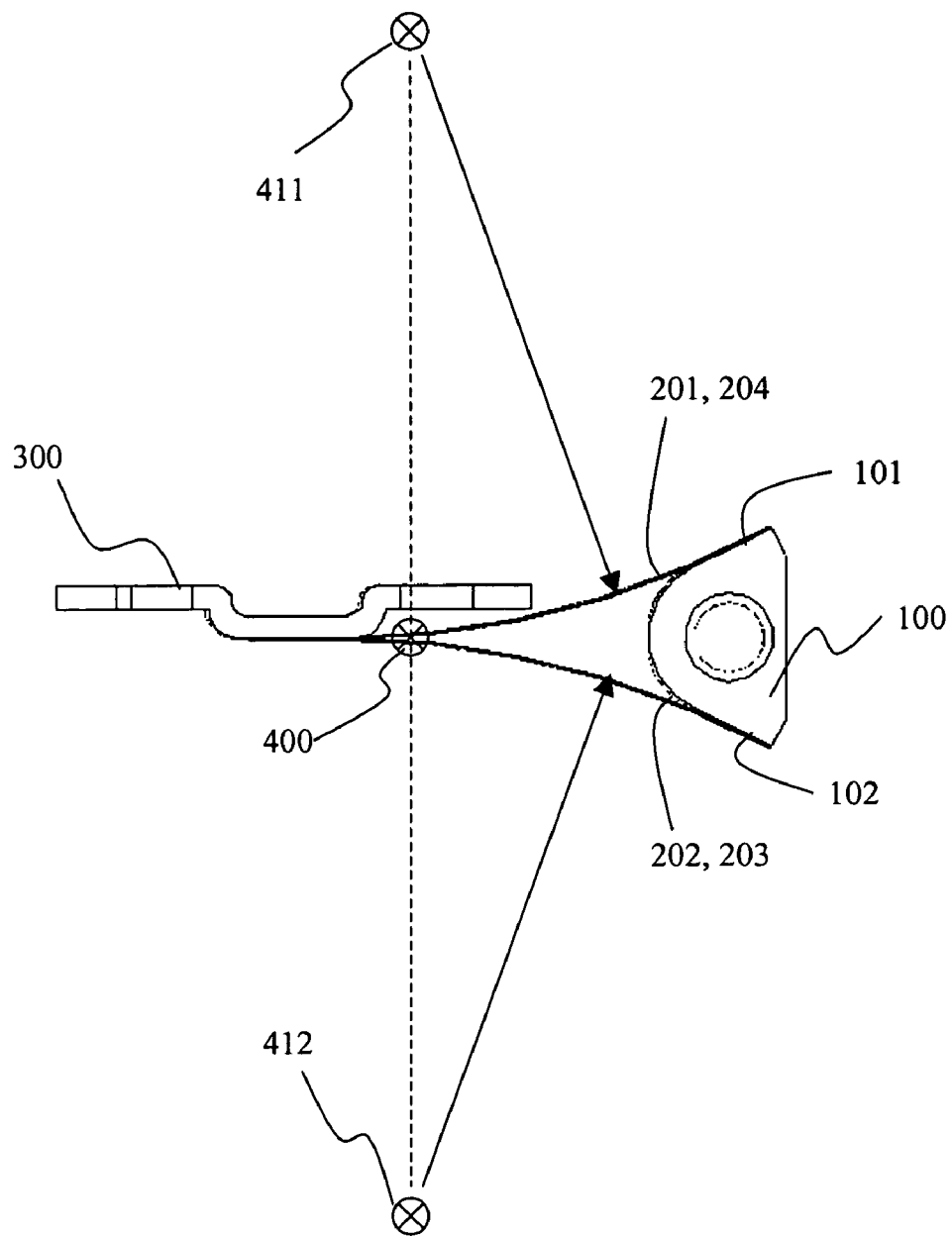
FIG. 3 shows a top or axial view of the current invention, showing centers of curvature.
Figure 4:
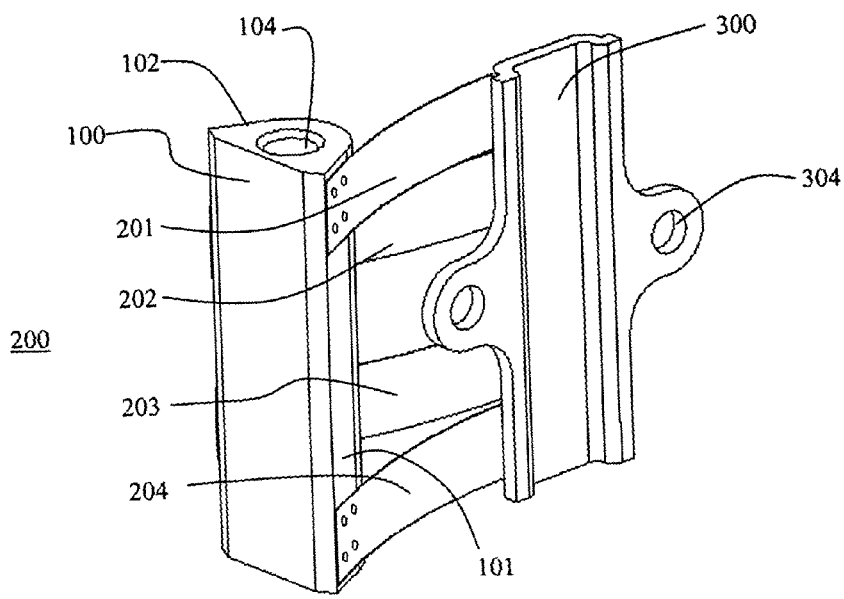
FIG. 4 shows the current invention, but from the opposite viewing direction as FIG. 2.

Before assembly, the flexure system 200 is flat. During assembly, the upper backside flexure 201 and lower backside flexure 204 are preloaded against the backside stationary post surface 101. This preload causes the backside flexures 201 and 204 to deform and assume a shape with variable curvature. As shown in FIG. 3, the approximate backside center of curvature 411 of backside flexures 201 and 204 is spaced away from the stationary post 100, in a direction normal to the backside stationary post surface 101. Similarly, during assembly, the upper frontside flexure 202 and lower frontside flexure 203 are preloaded against the frontside stationary post surface 102. The preload causes the frontside flexures 202 and 203 to deform and assume a shape with variable curvature. The approximate frontside center of curvature 412 of frontside flexures 202 and 203 is spaced away from the stationary post 100, in a direction normal to the frontside stationary post surface 102. After affixing, the preload force of the backside flexures 201 and 204 will equal in magnitude the preload force of the frontside flexures 202 and 203. The preload forces are in opposite directions and hence, provide a stable resting position of the movable post 300. Preload forces are chosen to ensure no yielding during the assembly, full limit rotation of the movable post 300, or during static and dynamic loading.

As shown in FIG. 2, spot welds 103, produced by such methods as resistance, laser, ultrasonic or radio frequency, are the preferred method of affixing the flexure system 200 to the stationary post 100. Spot welds 303 are the preferred method of affixing the flexure system 200 to the movable post 300. Alternatively, adhesives, such as epoxies, glues, contact cement, and pressure-sensitive-adhesive, or mechanical fasteners, such as screws and spring-clips, could be used to affix the flexure system 200 to the stationary post 100 or to the movable mount 300.

Figure 5:
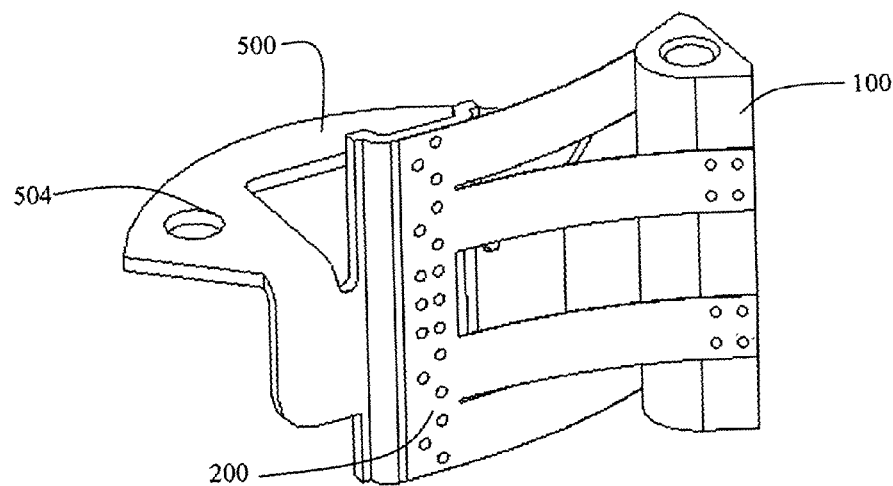
FIG. 5 is an isometric view of an alternate configuration of the current invention with a mounting flange perpendicular to the axis of rotation.
Figure 6:
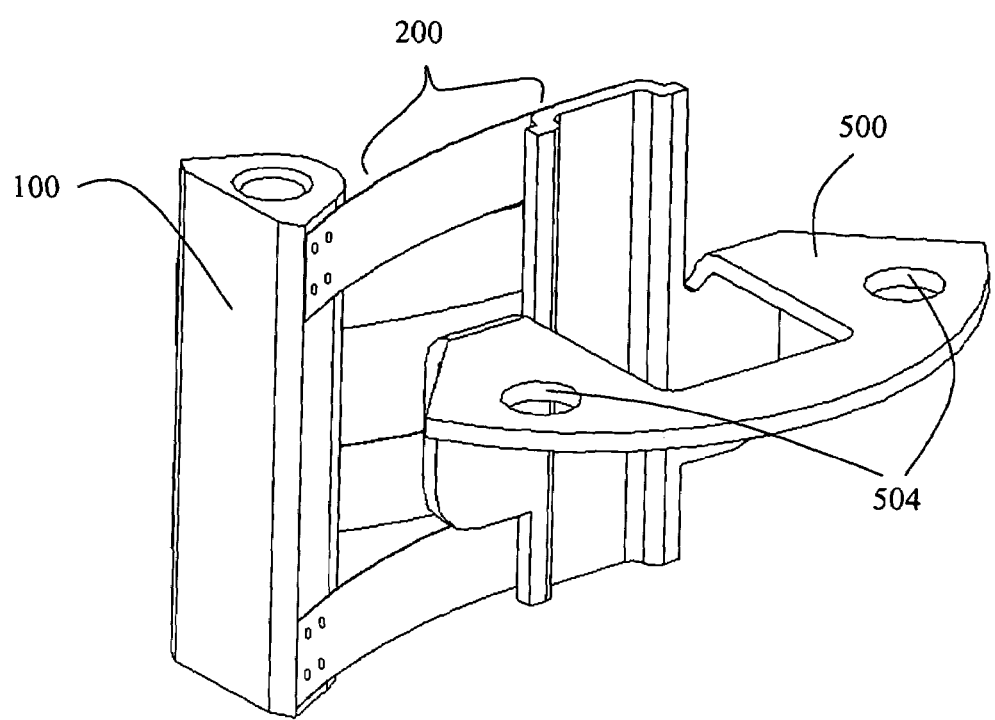
FIG. 6 shows the alternate configuration, but from the opposite viewing direction as FIG. 5.

FIG. 2 depicts threaded mounting holes 104, which are located at both ends of the stationary post 100, allowing either doubly-supported attachment of the stationary post 100 for highest mechanical stiffness or cantilever attachment of the stationary post 100 for the simplest attachment. The movable post 300 has mounting holes 304, aligned with the lateral direction 405, which allow the attachment of the device to be rotated. FIG. 5 and FIG. 6 depict an alternate configuration of the movable post 500 with axial mounting holes 504.

Preferably the flexure system 200 is fabricated out of a high tensile strength spring steel alloy which will exhibit a fatigue-limit stress, allowing a nearly infinite flexural cycle life. A steel stationary post 100 and steel movable post 300 can allow assembly with the preferred spot welds 103 and 303.

Operation—Preferred Embodiment:

As shown in FIG. 3, the movable post 300 will rotate about an axis of rotation 400, which is approximately parallel to the backside flexure center of curvature 411 and the frontside flexure center of curvature 412. The axis of rotation 400 lies approximately on a line drawn between the backside flexure center of curvature 411 and the frontside flexure center of curvature 412.

Rotation of the movable post 300 about the axis of rotation 400 in an angular direction 401 (clockwise from above) will generally reduce the radius of curvature of the backside flexures 201 and 204, while increasing the radius of curvature of the frontside flexures 202 and 203. Similarly, rotation of the movable post 300 about the axis 400 in a direction 402 (counter-clockwise from above) will generally increase the radius of curvature of the backside flexures 201 and 204, while reducing the radius of curvature of the frontside flexures 202 and 203. During rotation in either direction 401 or 402, the axis of rotation 400 will move slightly.

As seen in FIG. 2, the tangency of the system of flexures 200 at the affixing movable post surface 301 provides a high mechanical stiffness in a longitudinal direction 404, the axial direction 403 and the pitch direction 407. The placement of the center of curvatures 411 and 412 on either side of the flexural system 200 provides a moderate mechanical stiffness in the lateral direction 405. The spacing of the flexural system along the axial direction 400 provides a moderate stiffness in the roll direction 406.

Description—Additional Embodiment:

While the preferred embodiment demonstrates one design of the current invention, many variations exist which may be chosen to optimize integration into different applications. For instance, the stationary post 100 of the preferred embodiment could be allowed to rotate, while the movable mount 300 could be fixed.

The backside flexures 201 and 204 could be located at the same positions along the axial direction as the frontside flexures 202 and 203. This may necessitate that the flexure system is comprised of two parts, the backside flexures 201 and 204 could be combined into a single backside flexure and the frontside flexures 202 and 203 could be combined into a single frontside flexure. The backside flexures 201 and 204 could alternatively be affixed to a different surface of the movable post 300, perhaps on the surface opposite the movable post surface 301. As a further variation, a single part comprised of frontside flexures 202 and 203 could be affixed to a single part comprised of backside flexures 201 and 204, which in-turn is affixed to the movable post surface 301.

The number of backside flexures and frontside flexures is a design variable. A single backside flexure and single frontside flexure can be used for the simplest design. Multiple backside flexures and frontside flexures may be employed to meet certain design requirements. Multiple backside flexures and frontside flexures allows the rotateable structure to be interleaved between flexures.

Backside flexure stiffness may be matched to the frontside flexure stiffness to provide a balanced mechanical rotational stiffness. Or the backside flexure stiffness may be unequal to frontside flexure stiffness to allow different restoring forces in the clockwise and counter-clockwise rotational directions.

The flexures of the preferred embodiment are shown as rectangular forms, but different geometries could be devised for optimizing mechanical stiffnesses, load stresses, pivot life, or variation of the axis of rotation 400.

Given the simple features required on the stationary post 100, it could be integrated into the chassis of the application, instead of fabricated as a separate part. Similarly, the movable post 300 could be integrated into the rotate-able component of the application, eliminating attachment features and attachment parts.

With the appropriate fabrication technology, two or more of three parts of the current invention, the flexure system 200, stationary post 100, and movable post 300, could be fabricated as a single part. For example, all three parts could be molded in a plastic resin simultaneously.

Alternate materials can be used in the construction of the flexure system 200, stationary post 100, and movable post 300. Many ferrous and non-ferrous alloys could be used for typical high-strength constructions. Plastic resins could be employed for simplified fabrication. Ceramics or semiconductors could be used for MEMS (Micro Electro-Mechanical Systems) applications, where devices are fabricated and assembled using semiconductor processes.

Conclusion:

The present invention simplifies the construction of a flexural pivot. The simple shapes of the stationary and rotational members simplify the fabrication of these components. The flexures can be made from flat raw materials. The attachment of the flexures is made on flat or simply-curved, external features of the stationary and rotational members. With this simple construction, the present invention allows flexural pivots to be scaled to fit into extremely small devices. Further, the simplified methods of attachment to the stationary and rotational members allows integration of these components into other parts of a device.

The invention claimed is:

1. A flexural pivot device, comprising:
   a stationary member having a first and second surfaces,
   a rotate-able member having a surface,
   a first flexible member affixed between and tangent to both said first surface of said stationary member and said surface of said rotate-able member such that said first flexible member is preloaded in a curved form with an approximate center of curvature above said first surface of said stationary member, and
   a second flexible member affixed between and tangent to both said second surface of said stationary member and said surface of said rotate-able member such that said second flexible member is preloaded in a curved form with an approximate center of curvature above said second surface of said stationary member.

2. A flexural pivot device of claim 1, wherein the first and second flexible members are made of a material selected from the group consisting of ceramics, semiconductors and plastic resins.

3. A flexural pivot device of claim 1, wherein the first flexible member is formed integral with the second flexural member with a substantially planar form contiguous through the first flexible member, second flexible member and connecting region.

4. A flexural pivot device of claim 1, wherein the first flexible member is affixed to the stationary member by a spot welding method selected from the group consisting of resistance, laser, ultrasonic, and radio-frequency.

5. A flexural pivot device of claim 2, wherein the first flexible member is formed integral with the stationary member.

6. A flexural pivot device of claim 2, wherein the first flexible member is formed integral with the rotate-able member.

7. A flexural pivot device, comprising:
   a stationary member having a surface,
   a rotate-able member having a first and second surfaces,
   a first flexible member affixed between and tangent to both said surface of said stationary member and said first surface of said rotate-able member such that said first flexible member is preloaded in a curved form with an approximate center of curvature above said first surface of said rotate-able member, and
   a second flexible member affixed between and tangent to both said surface of said stationary member and said second surface of said rotate-able member such that said second flexible member is preloaded in a curved form with an approximate center of curvature above said second surface of said rotate-able member.

8. A flexural pivot device of claim 7, wherein the first and second flexible members are made of a material selected from the group consisting of ceramics, semiconductors and plastic resins.

9. A flexural pivot device of claim 7, wherein the first flexible member is formed integral with the second flexural member with a substantially planar form contiguous through the first flexible member, second flexible member and connecting region.

10. A flexural pivot device of claim 7, wherein the first flexible member is affixed to the stationary member by a spot welding method selected from the group consisting of resistance, laser, ultrasonic, and radio-frequency.

11. A flexural pivot device of claim 8, wherein the first flexible member is formed integral with the stationary member.

12. A flexural pivot device of claim 8, wherein the first flexible member is formed integral with the rotate-able member.

* * * * *